April 12, 1955 T. COLLINS ET AL 2,705,910
GRAIN VENTILATING TUNNELS AND BUILDINGS INCLUDING SAME
Filed April 6, 1951 2 Sheets-Sheet 1

INVENTORS
T. COLLINS,
R. L. COLBY JR.
& V. A. ROUDOY

BY
ATTORNEY

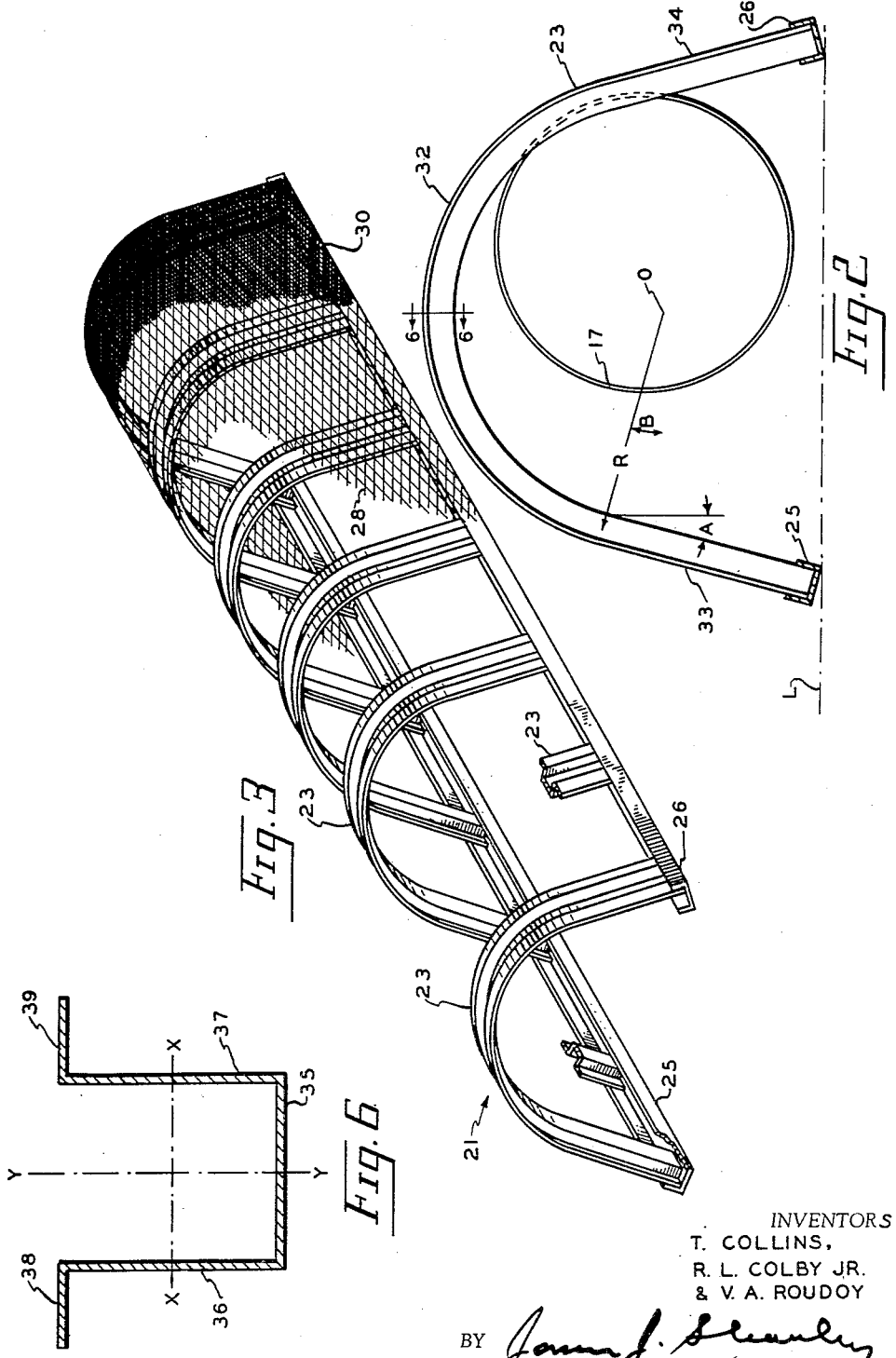

United States Patent Office 2,705,910
Patented Apr. 12, 1955

2,705,910

GRAIN VENTILATING TUNNELS AND BUILDINGS INCLUDING SAME

Tappan Collins, Grosse Pointe Woods, Roy L. Colby, Jr., Dearborn, and Victor A. Roudoy, Huntington Woods, Mich., assignors to National Steel Corporation, a corporation of Delaware Application April 6, 1951, Serial No. 219,713

17 Claims. (Cl. 98—56)

The present invention relates to improvements in grain storage buildings including novel means for ventilating the stored grain and to novel ventilating tunnels for ventilating grain in storage buildings.

Large quantities of grain are stored in buildings over extended periods. Many of these buildings enclose a large mass of grain piled on its floor to a relatively great depth. It is essential that air be flowed through the grain to remove the excess moisture and to cool the grain and prevent spoilage and spontaneous combustion. The problem of providing the necessary ventilation becomes increasingly difficult as the size of the building and the mass of grain increases. In a large percentage of such buildings, it is essential that forced ventilation be provided, and various means for effecting grain ventilation have been proposed. The problems involved in effecting proper ventilation are difficult to solve. It has been proposed, for example, that one or more tunnels be provided in the building extending across the floor at the bottom of the pile of grain with an arrangement for forcing air through the tunnel and the pile of grain. For such a tunnel to adequately ventilate the grain, the tunnel must be so designed that the grain is completely and uniformly ventilated with an adequate volume of air at the proper velocity, such as a large volume of air of relatively low velocity, for example. To provide a large volume of air at relatively low velocity, the tunnel should have a relatively large cross-sectional area, and both the cross-sectional area and the longitudinal area should contain a minimum amount of obstructions to the flow of air in the tunnel and through the wall of the tunnel. In addition, air should flow uniformly down through the grain and through the sides of the tunnel along its length, and it is essential that the air flow both horizontally and vertically through the tunnel wall to ventilate completely the grain and avoid "dead spots" where the grain is not aerated.

For such a ventilating tunnel to be commercially practical, there are a number of other requirements which must be satisfied. One requirement is that the tunnel have sufficient height to provide a clear safe crawl space so that a man may crawl the length of the tunnel to inspect its operation and the condition of the grain. It is quite important that the cost of ventilating tunnels be kept low as these tunnels are used in large numbers, and the cost of the tunnels increases the cost of grain storage. To keep the cost of such tunnels low enough to be economically feasible, it is important that the tunnels be produced in large quantities at the lowest cost possible. It is more economical to produce the tunnels at a manufacturing plant and then ship them to the scattered points of use. Quite frequently, these ventilating tunnels must be very long—for example, fifty feet or more—and such long ventilating tunnels can not be handled or shipped readily. Therefore, the tunnel should be made in sections that can be readily assembled together in the field and that can be readily disconnected for removal from the building to permit use of the building for other purposes when not needed to store grain. It is highly desirable that the tunnel sections be constructed so that they can be nested during shipment or storage so as to occupy a minimum space.

While various types of grain ventilating tunnels had been proposed in the past, we know of no such tunnels or tunnel sections which have met satisfactorily all of the various requirements, particularly the requirements of larger users—for example, the Department of Agriculture.

It is an object of this invention to provide an improved grain storage building containing one or more novel ventilating tunnels.

Another object of the present invention is to provide an improved ventilating tunnel for grain storage buildings that will completely and uniformly ventilate the grain and which contains a minimum of obstructions to the flow of air in the tunnel and through the tunnel wall.

Another object of the present invention is to provide a ventilating tunnel for grain storage buildings that will allow a large volume of air to flow through the tunnel at a relatively low velocity.

Another object of the present invention is to provide an improved ventilating tunnel for grain storage buildings that also provides a clear safe crawl space to permit inspection of the interior of the tunnel and the condition of the grain.

Another object of the present invention is to provide a novel tunnel section that can be used alone or readily connected to similar tunnel sections to form an improved long ventilating tunnel.

Another object of the present invention is to provide an improved means of connecting together a series of tunnel sections to form a grain ventilating tunnel with the connecting means permitting relatively easy disconnection of the tunnel sections so that the tunnel sections can be readily removed from the building to permit use of the building for other purposes.

Another object of the present invention is to provide improved tunnel sections that can be nested one within the other to occupy a minimum amount of space during storage and shipment.

Another object of the present invention is to provide a novel grain ventilating tunnel that has air passages substantially uniformly distributed throughout the covering of the peripheral surface of the tunnel.

The objects and advantages of the present invention will become more apparent from the following description, taken with the accompanying drawings, in which:

Figure 2 is a fragmentary sectional view taken along line 2—2 of Figure 1;

Figure 5 is an enlarged fragmentary sectional view taken along line 5—5 of Figure 1 illustrating the means for detachably connecting together in end-to-end relationship the tunnel sections of Figure 1; and Figure 6 is an enlarged transverse sectional view of a tunnel rib taken along line 6—6 on Figure 2.

Figure 1:
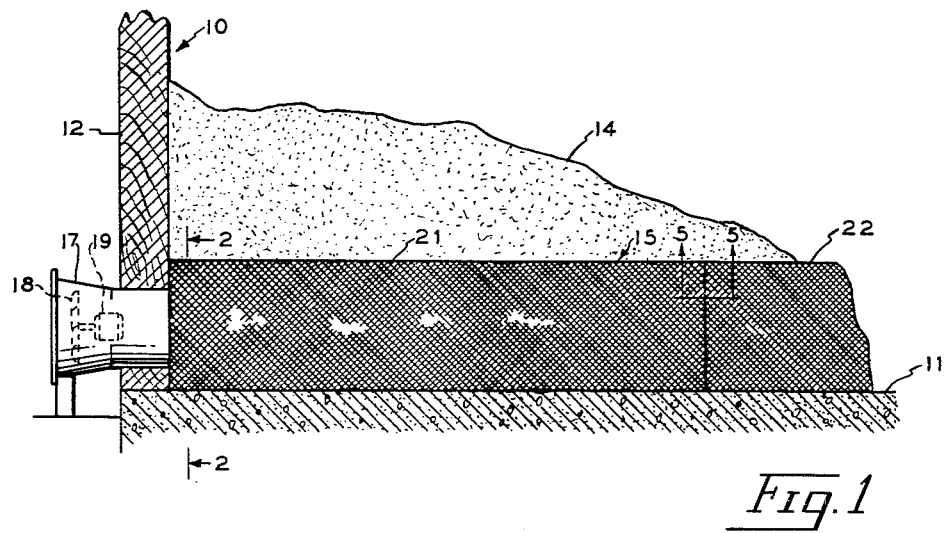
Figure 1 is a sectional view of a portion of a grain storage building including a ventilating tunnel and embodying the principles of the present invention.

Referring to the drawings, a grain storage building 10, only part of which is shown, is supported on a suitable foundation which may, for example, be a large concrete slab 11 which forms both a support and a floor for the building 10. The building 10 may be rectangular or circular and includes a sidewall 12. The grain 14 is placed in the building for storage and the grain is piled relatively deep and may, for example, be about 12 feet deep. Air must be flowed through the pile of grain 14 to remove the excess moisture or to cool the grain. In order to ventilate the grain, one or more tunnels 15 are placed in the building either on the floor or on stilts before the grain is discharged into the building for storage. The number of tunnels will depend on the size of the building. The United States Department of Agriculture requires, for example, that a building 100 feet by 40 feet having a storage capacity of somewhat over 38,000 bushels shall contain two tunnels, each 50 feet long, extending into the building from opposite ends. It is also required that the ventilating systems including the tunnels shall supply at least one cubic foot of air per minute for each bushel of grain when the grain contains any excess moisture and that the maximum velocity of the air through the tunnel shall not be more than 1500 feet a minute and, preferably, less. Thus, a large amount of air must be forced through the ventilating tunnel at a relatively low velocity, and this air must be distributed throughout the pile of grain. The deeper the pile of grain, the more grain can be stored in a building of a given size, and the amount of grain which can be stored safely is in turn a function of the air distribution characteristics of the tunnel and the strength of the tunnel. The tunnel must be able to support the grain piled on top of it. In order to meet the requirements of the United States Department of Agriculture, for example, the tunnel must be able to withstand a vertical pressure of 700 pounds per square foot and a horizontal pressure of 400 pounds per square foot.

The air may be drawn through the tunnel or may be blown into the tunnel. As shown in Figure 1, a fan casing 17 extends through the wall 10 with its inner end opening into one end of the tunnel 15. In the fan casing 17, there is mounted a fan 18 driven by an electric motor 19 to suck air down through the grain and into the tunnel. The fan can be reversed to blow air into the tunnel and then through the grain.

As shown more clearly in Figures 1 and 2, the fan housing 17 is smaller than the ventilating tunnel and is aligned with the tunnel, although the center of the fan housing need not be aligned with center of the housing. The fan housing may, if desirable, be as large as the tunnel. The smaller the fan housing, the greater the velocity of the air flowing through the housing with other conditions being constant. The users of ventilating tunnels are primarily concerned with the velocity of the air flowing longitudinally of the tunnel. The air velocity in the fan housing is not a major consideration. It is to be understood that other sizes and shapes of fans and fan housings may be used.

Figure 3:
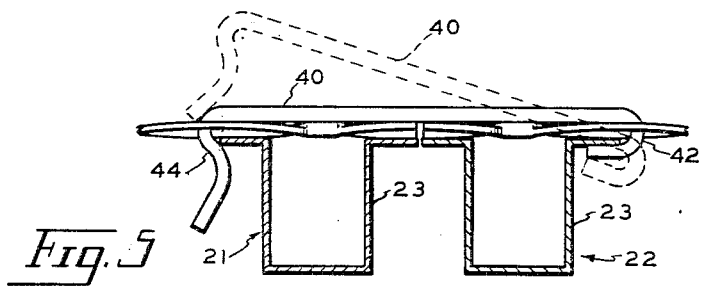
Figure 3 is an enlarged cabinet view of a ventilating tunnel embodying the principles of the present invention and with portions broken away to better illustrate the details of the construction.

The tunnel 15 may be made up of one or more tunnel sections. As shown in Figure 1, the tunnel 15 includes two tunnels or tunnel sections 21 and 22. These tunnel sections are identical, and only one will be described in detail. Referring more particularly to Figure 3, the elongated tunnel section 21 includes a plurality of arched ribs 23 extending transversely across and from side to side of the tunnel section. The ribs 23 are laterally spaced apart along the length of the tunnel section with a rib at each end. The number of intermediate ribs depends to a certain extent of the length of the tunnel section. At the two longitudinal sides of the tunnel section, there are sill members 25 and 26. The sill members are similar and each receives the respective ends of the ribs 23. Preferably, the sill members are channel-shaped as shown so that the ends of the ribs fit into the sill members and between the sides of the sill members. The ends of the ribs 23 are connected to the sill members 25 and 26, respectively, by welds or other suitable means.

Figure 4:
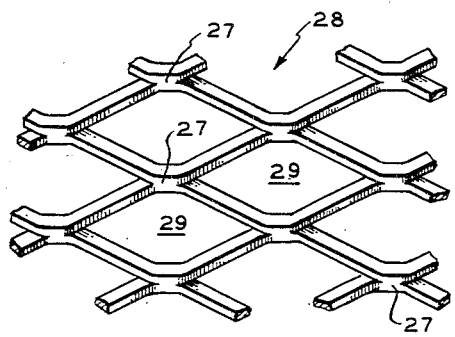
Figure 4 is an enlarged fragmentary view of a portion of the metal covering of the tunnel of Figures 1 and 3.

The tunnel section 21 is covered with an innercovering of sheet metal 28, a portion of which is shown in Figure 4. The sheet metal 28 contains relatively large openings 29, each having a length greater than its width, and the metal is placed on the ribs 23 with the openings having their length or longest dimension extending longitudinally of the tunnel section. The shortest dimension or width of these openings extends in the direction of curvature of the sheet metal. Placing the sheet metal 28 on the tunnel in this manner provides two important advantages: The metal is more easily bent or curved in the direction of the shorter dimension of the openings and is stronger in the direction of the longest dimension of the openings. The metal covering 28 is fastened to the flanges of the ribs 23 in a suitable manner, preferably by welding, and in addition to covering the tunnel the sheet metal 28 braces the ribs and prevents each rim from tilting laterally about its ends in the sill members 25 and 26. With the openings 29 arranged as described, the sheet metal 28 provides the maximum amount of bracing while being relatively more easily curved around the rib framework than would be the case if the sheet metal was bent in the opposite direction. Thus, the tunnel section comprises a skeleton framework of ribs 23 which are laterally spaced apart along the length of the section with the bottom ends of the ribs being connected together by the sill members 25 and 26. The expanded metal covering 28 also braces the ribs 23 in addition to forming a uniform support for an outer covering of relatively fine wire mesh screen 30. The openings 29 in the expanded metal are relatively large and may, for example, be about 1" x 2". The relatively fine wire mesh screen has little strength but is fully supported by the expanded metal 28 and the relatively small openings in the screen 30 prevent any grains from passing through the covering of the tunnel section to fill the tunnel or reduce its cross-sectional area. It is quite important that no material quantity of grain work its way into the interior of the ventilating tunnel.

In order to have commercial acceptance of an article, the manufacturer customarily attempts to construct an article in the most economical manner. In a ventilating tunnel, the less metal used the lower the cost. It is well known that for a given area a circle has the shortest perimeter. In view of this, it is believed obvious that if the ribs 23 are semi-circular they would have the shortest possible length for encompassing the required cross-sectional area of the tunnel. We have discovered that a number of unobvious advantages are obtained when the arched ribs 23 are not semi-circular but are shaped as more fully hereinafter described.

Referring more particularly to Figures 2 and 3, the arched rib 23 includes an arcuate center portion 32 curved about the center O through a radius R. The arched rib 23 also includes opposite outer end portions 33 and 34 which extend downwardly and outwardly from the opposite ends of the arcuate center portion 32. In other words, the sides of the arched rib are flared outwardly. The arcuate center portion 32 extends through an arc of less than 180° and the straight outer end portions 33 and 34 extend tangentially from the ends of the center portions. The straight end portions 33 and 34 need not be perfectly straight but may be slightly curved so that the longitudinal axis of the rib 23 is bent through a curve of changing radius with the radius at the peak being the shortest and the radius as it moves down each side increasing in length. The expression "substantially straight" when used in connection with the opposite outer end portions of rib 23 is intended to read on these end portions when straight as shown, or when slightly curved so that the end portions are more nearly straight than the center portion. The expression "substantially arcuate" when used in connection with center portion 32 is intended to read on such a portion when curved about a center through a radius of constant length or through a radius of increasing length with this radius being shorter than the radius of the substantially straight portions 33 and 34. With this arrangement, the center O of the substantially arcuate center section 32 is located a distance above the plane of the outer ends indicated by the line L, and this distance preferably is less than R. Each end portion 33 and 34 is preferably inclined downwardly and outwardly at an angle such that the maximum width of the arched rib or tunnel is greater than the maximum height of the tunnel.

We have discovered that forming the rib with the substantially straight flared end portions provides a number of advantages. One important advantage is that it raises the height of the tunnel so that the tunnel has a greater height than it would if it were semi-circular in cross section and had the same area. This additional height increases the crawl space which is highly desirable.

Another very important advantage of the present arched ribs resides in the fact that they permit providing a tunnel that is relatively free of obstructions without using an excessive quantity of metal in the rib. The arched rib 23 has a shape that can eliminate the necessity or desirability of struts and tie rods. This will become more apparent upon considering the properties of an arched rib having a substantially semi-circular shape. If the rib were made of the same weight of metal and curved through a semi-circle and if the radius were such as to provide the same cross-sectional area for the tunnel as is shown in the drawing, then the semi-circular rib would require additional support. The maximum bending moment would be at the peak of the tunnel and would be positive so that the center portion of the semi-circular rib would tend to collapse and the bottom ends of the rib would tend to spread. Accordingly, it would be necessary to provide a tie rod extending across the tunnel between the lower ends of the rib. While it would be possible to increase the gauge of the metal and the size of the cross-section, this would have a number of disadvantages including inefficient use of the metal. In the present arched rib, the central portion 32 is curved through an arc having a shorter radius than would be required if the entire rib were curved through 180°.

The additional area is acquired by using the substantially straight, flared portions 33, 34 to raise the center portion of the arched rib. With the downwardly and outwardly flared side portions 33 and 34 being utilized, it is possible to arrange the parts so that the necessity for a tie rod is eliminated. It is possible to flare the side portions so that the ends of the ribs have a tendency to move inwardly instead of outwardly. Preferably, the angle of flare is such that the forces tending to push the ends of the rib inwardly substantially balance the forces tending to spread the ends so that neither a strut nor a tie rod across the bottom of the tunnel is needed or would serve an appreciably useful purpose.

The preferred shape and flare of the arched rib will depend to a certain extent upon the load and its distributions that the rib must support. As previously stated, the present ribs and tunnel section are designed to support a vertical pressure of 700 pounds per square foot and a horizontal pressure of 400 pounds per square foot. This difference in vertical and horizontal pressure results from the fact that grain is not a perfect fluid and when in a pile the grain has an angle of repose so that the grain does not exert a uniform pressure in all directions as does a body of liquid. With these vertical and horizontal pressures, it has been found that the angle of the flare, angle A, should be about 15°. The angle B equals angle A so that the center portion 32 extends through an arc of about 150°. Thus, with the present arched rib, we use the metal more efficiently than it would be if the rib were semi-circular. In addition, if the rib were semi-circular, it would be necessary to use much heavier metal or use a strut and tie rod which would be highly undesirable. The use of struts or tie rods would prevent nesting of the sections, reduce the cross-sectional area of the tunnel so that the tunnel would have to be enlarged, and would interfere with anyone attempting to crowl through the tunnel to inspect the interior.

The arched rib 23 has in cross-section a channel-shape and, preferably, has in cross-section a hat-shape, as shown. The hat-shape includes an inner web portion 35, laterally spaced apart side web portions 36 and 37 terminating in the outwardly extending flanges 38 and 39, respectively. The side web portions 36 and 37 may be parallel or be flared outwardly. We have found that the radial stresses in an initially curved rib in bending puts a premium on the hat section. It is possible to proportion the shape so that it is stiffer about axis Y—Y and also stronger about axis X—X. If, for example, metal of the same guage and width were bent into the shape of an I beam, the beam would not be as stiff about axis Y—Y as is the shape shown. The side web portions 36 and 37 move the metal outwardly away from the Y—Y axis so as to increase its stiffness. It is desirable that the ribs be stiff about the axis Y—Y so as to reduce the tendency of the ribs to twist about this axis and buckle. This in turn reduces the necessity and desirability of using braces extending between adjacent ribs. Preferably, the cross-sectional area of the rib is proportioned so that axis Y—Y is the major axis with the member being the stiffest about this axis. In addition, the member is strong about the minor axis, axis X—X. We have found another advantage resulting from having the cross-sectional area relatively shallow with axis X—X the minor axis which is that the rib does not extend inwardly very far and provides a maximum unobstructed cross-sectional area in the tunnel.

The outer covering of relatively fine wire is quite flexible and can not support appreciable loads. The sheet metal 28 may be formed in any suitable manner. Preferably, the sheet metal covering is formed by cutting slits in sheet metal, then expanding the sheet metal so that a major portion of the area is taken up by the openings. We also have found that it is desirable that the expanded metal be in a non-flattened condition. When sheet metal is expanded and not flattened, the metal is not located in a common plane. Where the metal bounding one opening joins the metal encircling an adjacent opening as at 27, this metal is thicker than the metal sheet when measured in a direction normal to the plane of the sheet. The expanded sheet metal in the non-flattened condition is somewhat stronger in the direction of the longest length of the opening so as to provide better bracing of the ribs. Another important advantage is that when the expanded metal is curved about and fastened to the tunnel section, the metal, if not flattened, will be a stronger beam between the ribs.

The expanded sheet metal 28 supports the fine wire mesh screen throughout its area. The fine wire mesh screen which may, for example, be about 16 mesh for the very small grains, has openings small enough to prevent the passage of grain through the covering into the interior of the tunnel. The only portion of the screen covering which is completely obstructed are those portions of the screen in contact with the expanded metal and the openings are closely and regularly distributed over the entire surface area of the tunnel so that air may pass through the wall of the tunnel in all directions. The openings through the wall of the tunnel constitute a major portion of the tunnel wall surface area. If desirable, the user may use paper or other material to blank off portions of the surface area of the tunnel by placing the paper on the inner surface of the tunnel. This is at times desirable when the ventilating tunnel is to be used for special requirements such as drying the grain at a particular point or for blowing in gaseous insecticides to a particular point in the grain.

A plurality of tunnel sections can be quickly connected together in a building to form a long ventilating tunnel when desirable. As shown in Figure 5, these sections may be arranged end to end, and each section has a rib 23 at each end so that the end ribs of two adjacent sections are in abutting relationship. A spring wire clip 40 has one end hooked over the inner edge of an end rib 23 of section 22 and the opposite end portion 44 of the wire clip 40 extends inwardly across the inner edge of an end rib 23 of the adjacent abutting tunnel section 21. The end portion 44 has a certain amount of spring and can be readily snapped over the inner edge of the rib. The clip 40 can be raised and readily removed by lifting upwardly on end 44. More than one such clip may be used if desirable to connect together the adjacent ends of each two sections of the tunnel.

We claim:

1. An elongated horizontal grain ventilating tunnel comprising a plurality of similar, upright arched ribs laterally spaced apart along the length of the tunnel, the ribs extending across from side to side of the tunnel and each having an outer end, a horizontal sill at each side of the tunnel connected to the respective outer ends of the arched ribs, each arched rib including a substantially arcuate center portion and substantially straight outer end portions extending downwardly and outwardly from the ends of the center portion to the sill members, and an outer arched peripheral covering extending about the ribs from side to side of the tunnel, the covering including expanded sheet metal containing openings so that a major portion of the area of the covering includes air passages extending through the covering.

2. An elongated, horizontal grain ventilating tunnel comprising a plurality of similar, upright arched ribs laterally spaced apart along the length of the tunnel, the ribs extending across from side to side of the tunnel and each having an outer end, a horizontal sill at each side of the tunnel connected to the respective outer ends of the arched ribs, each arched rib including a substantially arcuate center portion and substantially straight outer end portions extending downwardly and outwardly from the ends of the center portion to the sill members at an angle of about 15° relative to the vertical, and an outer arched peripheral covering extending about the ribs from side to side of the tunnel, the covering having a major portion of its area occupied by air passages extending through the covering.

3. An elongated, horizontal grain ventilating tunnel comprising a plurality of upright arched ribs laterally spaced apart along the length of the tunnel, the ribs extending across from side to side of the tunnel and each having an outer end, a horizontal sill at each side of the tunnel connected to the respective outer ends of the arched ribs, each arched rib including a substantially arcuate center portion extending through an arc of about 150° and substantially straight outer end portions extending downwardly and outwardly from the ends of the center portion to the sill members at an angle of about 15° relative to the vertical, and an outer arched peripheral covering extending about the ribs from side to side of the tunnel, the covering having a major portion of its area occupied by air passages extending through the covering.

4. The elongated, horizontal grain ventilating tunnel claimed in claim 3 in which the width of the tunnel at its base is greater than the maximum height of the tunnel.

5. An elongated, horizontal grain ventilating tunnel comprising a plurality of similar, upright arched ribs laterally spaced apart along the length of the tunnel, the ribs extending across from side to side of the tunnel and each having a lower outer end, a horizontal sill at each side of the tunnel connected to the respective outer ends of the arched ribs, each arched rib comprising in cross-section a hat-shape with each rib including an inner web portion, spaced side web portions extending upwardly from the inner web portion and flanges extending laterally outwardly from the outer edges of the side web portions with the flanges being parallel to the plane of the inner web portion, and an outer arched peripheral covering extending about the ribs from side to side of the tunnel, the covering having a major portion of its area occupied by air passages extending through the covering.

6. The elongated, horizontal grain ventilating tunnel claimed in claim 5, in which the cross-sectional area of each rib has mutually perpendicular major and minor axes with the major axis being disposed in a vertical plane normal to the plane of the inner web portion.

7. The elongated, horizontal grain ventilating tunnel claimed in claim 6 in which each of the ribs includes an arcuate center portion curved about a center through about 150° and includes an outer end portion at each side of the tunnel extending from the respective end of the center portion downwardly and outwardly to the respective sill member with the angle of inclination of each outer end portion being about 15° from the vertical, and in which the tunnel has a width at its base greater than its maximum height.

8. An elongated, horizontal grain ventilating tunnel comprising a plurality of similar upright arched ribs laterally spaced apart along the length of the tunnel, the ribs extending across from side to side of the tunnel and each having a lower outer end, a horizontal sill at each side of the tunnel connected to the respective outer ends of the arched ribs, and an outer arched peripheral covering extending about the ribs from side to side of the tunnel, the covering including expanded sheet metal extending around and connected to the ribs and having a major portion of its area occupied by air passages extending through the covering, the expanded sheet metal containing openings each having a length greater than the opening width with the length of the openings extending longitudinally of the tunnel and the width of the openings extending transversely of the tunnel and in which the outer peripheral covering includes a fine wire mesh screen extending about the tunnel and supported by the expanded sheet metal.

9. The elongated, horizontal grain ventilating tunnel claimed in claim 8 in which the expanded sheet metal is not flattened.

10. The elongated, horizontal grain ventilating tunnel claimed in claim 9 in which each rib includes a substantially arcuate center portion and substantially straight outer end portions extending downwardly and outwardly from the ends of the center portion to the sill members.

11. The elongated, horizontal grain ventilating tunnel claimed in claim 10 in which each outer end portion of each rib extends downwardly and outwardly at an angle of about 15° relative to the vertical and the center portion of each rib extends through an arc of about 150° and in which the width of the tunnel at its base is greater than the maximum height of the tunnel.

12. The elongated, horizontal grain ventilating tunnel claimed in claim 11 in which each arched rib has in cross-section a hat-shape with each rib including an inner web portion, spaced side web portions extending upwardly from the inner web portion and flanges extending laterally outwardly from the outer edges of the side web portions with the flanges being parallel to the plane of the inner web portion and in which the cross-sectional area of each rib has mutually perpendicular major and minor axes with the major axis being disposed in a vertical plane normal to the plane of the inner web portion.

13. A grain storage building structure comprising a floor, a horizontal, elongated grain ventilating tunnel on the floor, a wall at a side of the floor, and blower means extending through the wall and arranged for circulating air through the tunnel, the tunnel including a plurality of similar, upright arched ribs longitudinally spaced apart along the length of the tunnel, the ribs extending across from side to side of the tunnel and each having a lower outer end, a horizontal sill at each side of the tunnel connected to the respective outer ends of the arched ribs, each arched rib including a substantially arcuate center portion and substantially straight outer end portions extending downwardly and outwardly from the ends of the center portion to the sill members, and an outer arched peripheral covering extending about the ribs from side to side of the tunnel, the covering having a major portion of its area occupied by air passages extending through the covering.

14. The grain storage building structure claimed in claim 13 in which each arched rib has in cross-section a hat-shape with each rib including an inner web portion, spaced side web portions extending upwardly from the inner web portion and flanges extending laterally outwardly from the outer edges of the side web portions with the flanges being parallel to the plane of the inner web portion, the cross-sectional area of each rib having mutually perpendicular major and minor axes with the major axis being disposed in a vertical plane.

15. The grain storage building structure claimed in claim 14 in which the outer peripheral covering includes non-flattened expanded sheet metal extending around and connected to the ribs, the expanded sheet metal containing openings each having a length greater than the opening width with the length of the openings extending longitudinally of the tunnel and the width of the openings extending transversely of the tunnel and in which the outer peripheral covering includes a fine wire mesh screen extending about the tunnel and supported by the expanded sheet metal.

16. The grain storage building structure claimed in claim 13 in which the tunnel is sectional, each section being defined at each end by a rib and an edge of the covering coinciding with the rib, and fastening means acting between adjacent end ribs of contiguous sections to connect the sections together.

17. The grain storage building structure claimed in claim 16 in which the fastening means includes a latch portion engaging one rib.

References Cited in the file of this patent

UNITED STATES PATENTS

| | | |
|---|---|---|
| 206,096 | Elliott | July 16, 1878 |
| 1,256,677 | French | Feb. 19, 1918 |
| 1,319,267 | Brown | Oct. 21, 1919 |
| 2,126,107 | Gordon | Aug. 9, 1938 |
| 2,196,391 | Gronert | Apr. 9, 1940 |
| 2,466,362 | Blake et al. | Apr. 5, 1949 |
| 2,572,955 | Schumacher | Oct. 30, 1951 |